Figure 1:
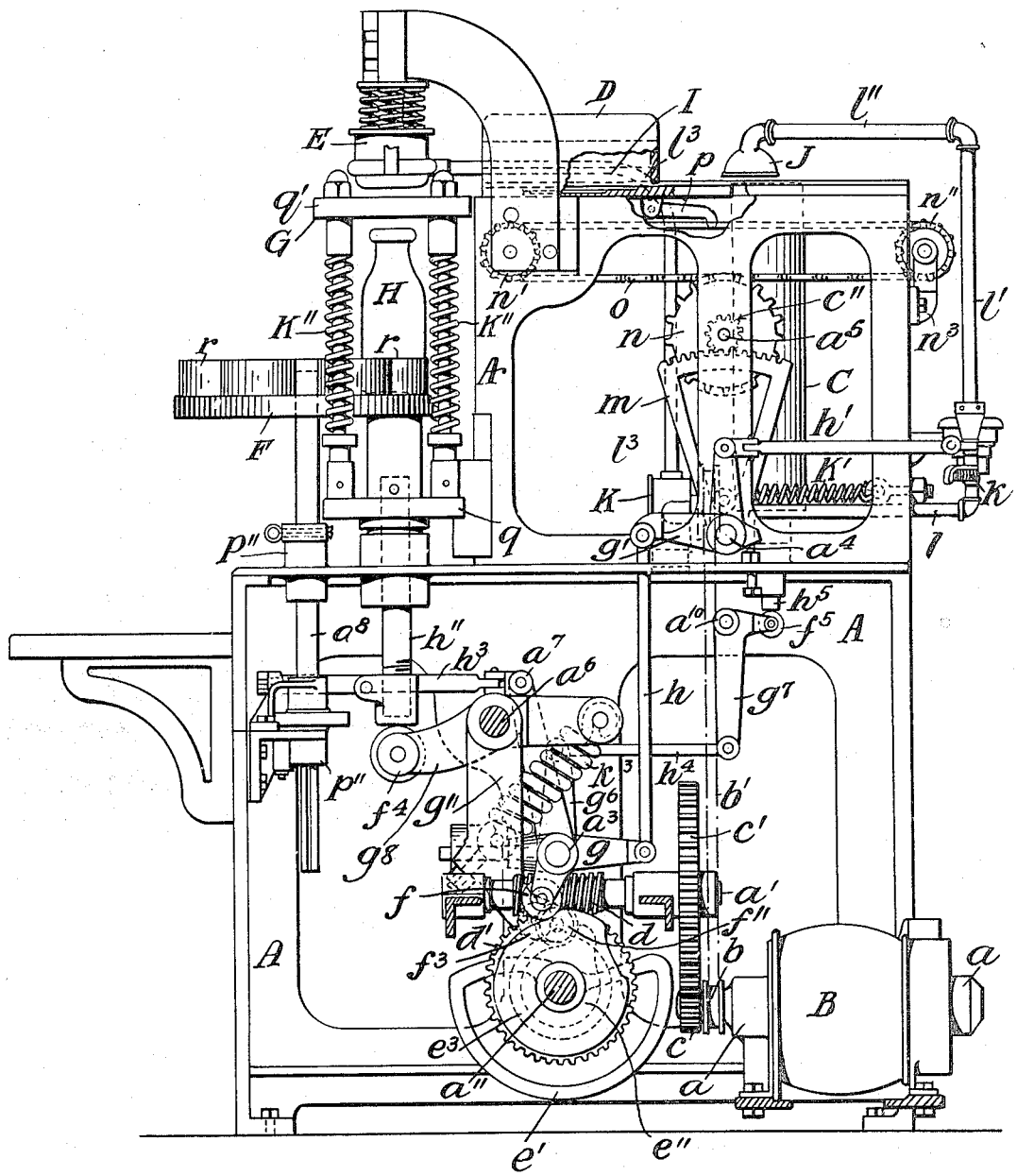

A. WESTLAKE.
MACHINE FOR SELECTING, TREATING, AND APPLYING CLOSURE SEALS.
APPLICATION FILED NOV. 12, 1913.

1,137,820.

Patented May 4, 1915.
3 SHEETS—SHEET 1.

Attest:
Lillian Mackenhorst

Albert Westlake Inventor:
by W. P. Preble Atty.

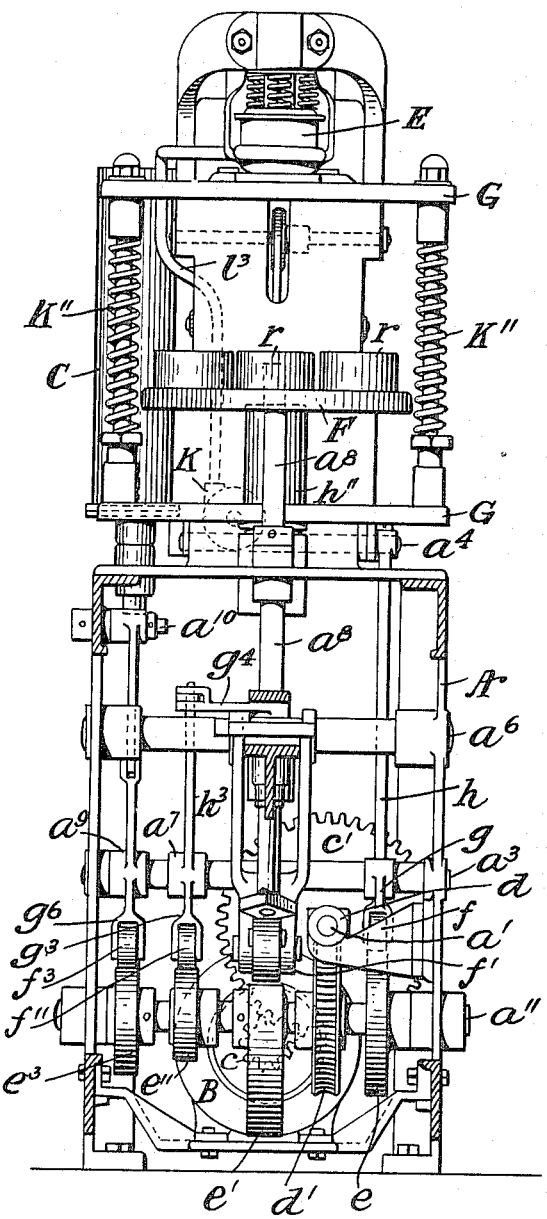

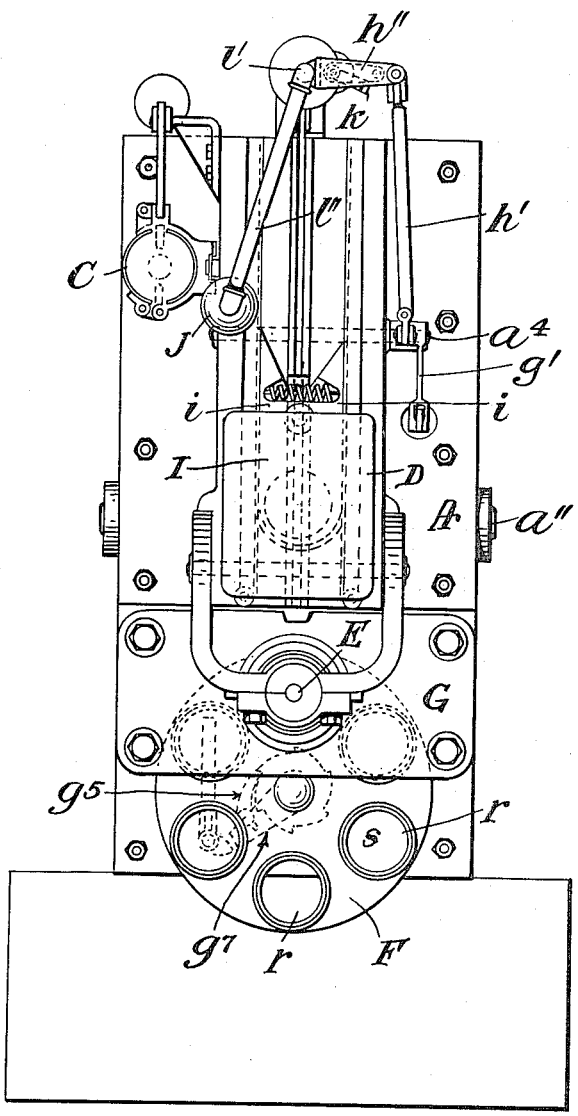

UNITED STATES PATENT OFFICE.

ALBERT WESTLAKE, OF NEW YORK, N. Y.

MACHINE FOR SELECTING, TREATING, AND APPLYING CLOSURE-SEALS.

1,137,820. Specification of Letters Patent. Patented May 4, 1915.

Application filed November 12, 1913. Serial No. 800,486.

*To all whom it may concern:*

Be it known that I, ALBERT WESTLAKE, a citizen of the United States, and a resident of the city, county, and State of New York, have invented certain new and useful Improvements in Machines for Selecting, Treating, and Applying Closure-Seals, of which the following is a specification.

My invention relates to machinery which is used in the rapid sealing of a continuous succession of bottles or other receptacles. This involves the seizing or selecting from a constantly replenished supply of the necessary caps or other sealing materials, one at a time, subjecting the same to suitable treatment to adapt them for application as a closure seal and applying them after such treatment to the receptacle to be sealed.

In the accompanying drawings I have selected a milk bottle as the receptacle to be sealed, and have shown a machine adapted to perform the various operations needed to seal automatically and effectively a continuous supply of milk bottles presented to it, one at a time, by means of a rotary table on which a number of such bottles are placed. The attendant has simply to remove the filled and capped bottle as soon as it emerges from the sealing mechanism, and to substitute a fresh full bottle.

Figure 1 is a side elevation with the side base frame removed. Fig. 2 is a front elevation with the front base removed. Fig. 3 is a top plan, looking from the front.

Same letters indicate similar parts in the different drawings.

A, A, represent the frame work of the machine upon which the moving parts are mounted.

B, is a motor from which power is derived and transmitted to the various parts of the machine.

C is a stack or feed cylinder in which are piled the sealing disks for capping the bottles as hereinafter explained.

D is a heating and sterilizing oven in which the disks are detained for a fixed length of time during their passage from the feed cylinder to the bottle.

E is the plunger head or capping tool by the action of which the disk is molded around the mouth of the bottle.

F is a rotary table upon which the milk bottles are placed and by the rotation of which the uncapped full bottles are carried, one at a time, to the capping plunger where they are held during the capping operation. By the further turning of the table, the capped bottles are brought into convenient position for removal.

G is a capping frame which coöperates with the plunger head in the sealing or capping operation.

H represents the bottle in position for the machine to begin operations.

I, is a carriage by which the sealing disk is brought through the oven D, into position between the top of the bottle and the capping plunger, and deposited upon the capping frame.

J is a swinging suction cup by which the disk is lifted from the feed cylinder and deposited upon the carriage.

K is a pumping engine which performs, as will hereafter be explained, the two operations of lifting and dropping the disk through the cap J, and cooling the cap after it has been molded upon the bottle.

These are the important features of my improved machine and the power for operating all of these parts is derived from the motor B, through various mechanical devices of which convenient and practical types are shown in the drawings, but which may be modified or varied as desired, and as will be readily understood by persons skilled in the art.

All the operations of my improved machine are timed with reference to each other so that the complete cycle of operations beginning with the picking up of a sealing disk from the stack C, and ending with the delivery of a capped and sealed bottle will be performed regularly for each fixed period during the running of the machine. This period for the machine shown in the drawings I preferably fix at about ten seconds, so that a fresh bottle fully and effectively capped is delivered by the turning table F every ten seconds.

The motor B, is mounted upon a shaft $a$, which we will call the motor-shaft and which is journaled in the frame-work A. This motor shaft carries a pulley $b$, and a pinion $c$. The pulley carries a belt $b'$, which operates the engine or pump K.

The pinion meshes with the gear $c'$, mounted upon the shaft $a'$, which is journaled in the frame A, and which we will call the worm-shaft. The worm $d$, upon this shaft, engages a worm-wheel $d'$ which is mounted upon the shaft $a''$ journaled in the framework A, and which we will call the main or cam-shaft, as from the rotation of this shaft the power is transmitted which operates all the above named important features with the exception of the pumping engine. This shaft $a''$ carries, in addition to the worm $b'$, the cams $e$, $e'$, $e''$, and $e^3$, (see Fig. 2). Of these, cam $e$, effects the swinging of the suction cup J as well as the forward and back movement of the carriage I. The cam $e'$ effects the operation of the capping-frame. The cam $e''$ rotates the table F, and the cam $e^3$ operates the feed cylinder.

To describe briefly these operations in turn: The revolution of the cam $e$ displaces the roller $f$, on the lower arm of the rocking arm $g$, of the rock-shaft $a^3$, the other arm being connected by the rod $h$, to the rocking-arm $g'$ on the rock-shaft $a^4$, the other end of which rocking-arm is connected by the rod $h'$ to the arm $h''$, (see Fig. 3), which grasps the upright pipe $l'$, to turn it positively in one direction, and allow it to be brought back to its normal position by the spring $k$. The pipes $l$, $l'$, and $l''$ leading from the pumping engine K to the suction cup J, serve the double purpose of exhausting the air of the cup so as to cause it to suck up a disk from the feed-cylinder, and of serving as a swivel support for said cup; the vertical pipe $l'$ having a swivel connection with the lower horizontal pipe $l$ and being attached to and moved by the arm $h''$. As before indicated, the operation of this swinging suction cup is timed with regard to the other operations of the machine so that the cup is ready to drop a disk upon the carriage I, every time said carriage is in a position to receive it. In other words, the swinging of the cup from the stack to the carriage and back is timed with reference to the to and fro travel of the carriage which is brought about from the rock-shaft $a^4$ as follows: Upon this rock-shaft is mounted the sector-rack $m$, (see Fig. 1) which engages the pinion $c''$ upon the shaft $a^5$, which we will call the sprocket-shaft.
This shaft carries the sprocket $n$, which engages the sprocket chain $o$, which passes over the smaller sprockets $n'$, and $n''$, mounted in brackets $n^3$ and the frame-work. From the carriage I, a depending finger or clutch $p$, hangs freely and engages a link on the sprocket chain $o$. The return movement of the sector-rack $m$, is brought about by the spring $k'$, attached to a fixed point on the frame-work A as shown in Fig. 1. The forward motion of the carriage is divided into two steps which correspond with the two depressions on the cam surface of the cam $e$. This is to allow the carriage to remain inside the oven D during the greater part of the revolution of the cam, and to make a single step quick return under the action of the spring $k'$. When the roller $f$ is in contact with the first of the depressions of the cam $e$, the carriage I is entering the oven D where it will stay while the revolution of the cam carries the roller upon the longer stretch. As soon as the second depression reaches the roller, the latter begins to fall and the carriage is then caused to take its second step forward which brings the disk under the plunger E and directly over a circular opening in the capping frame G, over the bottle H. As soon as this is accomplished, the carriage drops the disk and is swung quickly back to come under the suction cup J, by the spring $k'$. As far as this part of the operation of my machine is concerned, it is only necessary to add that the operation of the engine K is three-fold: It exhausts the air from the pipes $l$, $l'$, and $l''$ when it is desired to have the cup J pick up a disk. It fills said pipes with air at a later time to expel the disk in order to deposit it upon the carriage I. It also pumps air through the pipe $l^3$ which leads to the lower end of the plunger head E where the pipe is given a turn around the plunger-head and is provided with a number of small orifices by which the air is projected against the molded cap upon the top of the bottle to cool the same. While sometimes highly desirable for quick cooling, this artificial cooling as before stated, is not essential to my new process as natural cooling by radiation and loss of heat after the sealing operation is complete, may be employed if preferred.

The revolution of the cam $e'$ which is the largest of the four cams, and has to do the heaviest work, is utilized to operate the roller $f'$ on the lower end of the bent-arm $g''$ hanging from the shaft $a^6$, journaled in the frame-work, and carrying a second arm $g^8$ on which is mounted a roller $f^4$. These two arms are connected by the cushion spring $k^3$ depending from the capping-frame G, is a plunger-rod $h''$, so connected with the bottom plate of the capping frame that when moved upwardly by the roller $f^4$, the first part of the operation is to elevate the capping-frame as a whole until it comes against the usual stop, after which the continued upward movement of the rod $h''$ forces the lower plate $q$, of the capping-frame toward the upper plate $q'$ which is now stationary, thus compressing the four springs $k''$. This upward motion carries the bottle H up through the central opening in the upper plate far enough to cause the mouth of the bottle to lift the sealing disk and force it into the plunger-tool E which is of usual construction, thereby opening the plunger-tool so as to force the same to mold said disk around, and over the mouth of the bottle in the manner desired and for which said plunger-tool is adapted. As soon as the capping is complete, the position of the cam $e'$ has become such that the plunger rod $h''$ can descend, which it does under the combined weight of gravity and the resilient force of the springs $k''$, $k''$.

The revolution of the cam $e''$ is utilized to move the roller $f''$ on the lower end of the arm $g^3$ on rock-shaft $a^7$, the upper end of which arm is connected by the rod $h^3$, to a crank-arm $g^4$, which carries a pawl, $g^5$, the inner end of said arm being hung on the vertical shaft $a^8$, journaled in the framework, (see Fig. 1), and carrying the table F at the top. This shaft $a^8$ carries a six-sided racket shown in dotted lines in Fig. 3 which is moved one-sixth of a revolution by each thrust of the pawl $g^5$. It therefore takes six revolutions of the cam $e''$ to turn this table F once around. On the top of this table are arranged six boxes or rings, $r$, which are open at the bottom as well as the top, and set over the circular openings $s$, through the table, each of which is of a size adapted to allow the upper end of the bottle carrying plunger $h''$ to pass freely. A cushion is preferably interposed between the top of this rod $h''$ and the bottom of the bottle H to prevent breakage and the openings $s$, $s$, while of a size to permit the passage at the top of the plunger-rod, are small enough to leave a rim for the bottle to rest upon. The operation of this table in connection with the lifting plunger-rod $h''$ is such that while the plunger-rod is down the table is turned to bring a full bottle, and the opening over which it stands, directly in the path of the plunger. The table remains stationary during the up and down movement of the plunger and then receives another sixth of a turn which carries the capped bottle and its opening away, bringing a new full bottle and its opening in the path of the plunger.

The revolution of the cam $e^3$ is used to displace a roller $f^3$ on the lower end of the rocking-arm $g^6$ upon the rock-shaft $a^9$, the other end of the arm being connected by the rod $h^4$ to the lower end of the rocking arm $g^7$ on the rock-shaft $a^{10}$, the other end of which arm carries a roller $f^5$ (see Fig. 1) this roller lifts the rod $h^5$ which pushes up the stack of sealing disks contained in the feed cylinder C.

As before stated, these various details of devices and mechanism to bring about the desired steps of operation are only given as types of practical character and may be largely varied without departing from the spirit of my invention.

The complete operation of my improved machine as will be readily understood, is briefly as follows: The feed-cylinder C being supplied with the sealing disks, and at least two of the rings or pockets $r$, of the table F, being occupied by full bottles of milk, the machine is started. The four cams, $e$, $e'$, $e''$, and $e^3$ of the cam-shaft begin to revolve and cause the engine K to create suction in the cup J, which at that time is directly over the feed stack. This suction pulls up the top sealing disk and the cup then swings to a position over the carriage I, which at this time is at its rear position on the track on which it runs. The engine K now pumps air to the cup J, destroying the suction and expelling the disk so that it falls upon the carriage. The carriage now moves forward one step so as to convey the disk inside the oven D where the temperature, 212° F., or over, heats the disk to the desired point for the subsequent operation of molding, at the same time sterilizing said disk. The feed carriage then conveys the heated disk to a point directly over a circular opening in the top plate $q'$ of the capping-frame G, and there deposits it, retreating immediately to the initial position ready to receive a fresh disk. As soon as the heated disk has been deposited upon the top plate of the capping frame G, that frame begins to rise and the bottle is brought upward directly under the heated disk, lifts the same, carries it into the plunger tool E which is forced open by the rising bottle, and in which by reason of the interior construction of said tool, the heated disk is folded, molded, and rolled into proper shape and contact with the top of the bottle. The capping frame now descends, taking the capped bottle with it until the further downward movement of the bottle is stopped by its landing upon the table F, the frame and plunger-rod continuing to descend until they reach their normal position. By this time a new sealing disk has been carried into the oven and is waiting and heating until by the turning of the bottle, the capped bottle is moved away, and a fresh uncapped bottle brought into position to be lifted by the plunger rod $h''$.

I claim:

A machine for selecting, treating and applying closure seals, which comprises a disk feeding stack, a selecting device whereby the disks are removed one at a time from said stack, a conveyer adapted to receive and convey the disk as delivered to it by said selecting device, a heating mechanism through which said conveyer passes bearing the disk, a capping frame adapted to receive a heated disk from said conveyer and hold said disk in proper relation to the receptacle to be capped and sealed, a plunger tool which applies said disk to said receptacle and adjusting means whereby the operations of said devices are so harmonized, as to cap and seal a continuous succession of receptacles.

ALBERT WESTLAKE.

Witnesses:
LILLIAN NACKENHORST,
W. P. PREBLE.